United States Patent Office 2,734,028
Patented Feb. 7, 1956

2,734,028

KILLING ALGAE IN WATER WITH COPPER ALKANOLAMINE SALTS

Bernard Domogalla, Milwaukee, Wis.

No Drawing. Application February 8, 1952,
Serial No. 270,733

8 Claims. (Cl. 210—23)

This invention relates to the destruction and inhibition of the growth of algae in water or aqueous liquids.

Lakes, rivers, streams, drinking water supplies, swimming pools, shower rooms, and industrial water systems are frequently polluted by the excessive growth of algae and other micro-organisms which impart a distasteful appearance and odor to the water, generally interfere with the flow of the water and may be harmful to health.

Copper sulphate has been widely used as an algaecide to destroy and control the growth of algae. Copper sulphate has achieved some success in waters having a pH below 7. In alkaline waters with a pH over 7, and particularly in waters containing carbonates or bicarbonates, the copper sulphate is generally ineffective due to waste caused by precipitation of copper in the form of either insoluble copper hydroxide or copper carbonate. The precipitation of the copper in the hydroxide or carbonate form removes the toxic copper ions from solution and the beneficial killing action of the copper is for the most part lost. In addition the precipitated copper causes an undesirable turbidity or cloudiness in the water and settles in the form of a sludge or deposit which in case of a lake or stream may tend to destroy the fish life or zooplankton forms which are essential as fish food.

At the present time with copper being quite costly and not readily available, it is critical to find an algaecidal compound to replace copper sulphate and which will avoid the waste of copper heretofore accompanying the use of copper sulphate. Prior attempts have generally resulted in algaecides of excessive cost, or which were only suitable for closed circulatory systems, or which were toxic to fish or to zooplankton, or otherwise undesirable.

It is an object of the present invention to maintain the toxic copper ions in solution in alkaline waters in order to derive the full killing effect from the copper without waste.

Another object of the invention is to more rapidly penetrate the cell wall of the algae by the algaecide so as to enable the algaecide to be employed in bodies of fast moving water.

Still another object is to provide a method employing an algaecide which has an excellent killing power with regard to algae and other micro-organisms, and is less toxic to fish and zooplankton than ordinary algaecides.

Another object is to provide a method employing an inexpensive non-corrosive algaecide which requires a minimum amount of copper.

Another object is to utilize an algaecide which may be employed with equally effective results in large bodies of open water or in closed circulatory water systems.

The present invention is directed to the use of a hydroxymine preferably an alkanolamine, or the salt or ester of an alkanolamine, with a water soluble inorganic copper salt to produce an algaecide which will prevent the precipitation of copper in waters containing carbonates and bicarbonates and thereby maintain the toxic copper ions in solution available for use as an algaecide.

The alkanolamine may consist of one or more of the following compounds: monethanolamine, diethanolamine, triethanolamine, dimethylethanolamine, diethylethanolamine, aminoethylethanolamine, monoisopropanolamine, diisopropanolamine, triisopropanolamine, methyldiethanolamine, etc. Of the above named compounds triethanolamine was found to be a very economical and effective agent to use with the water soluble copper salt because it requires a smaller amount of the triethanolamine than the other named amines to keep the copper ions in solution.

The soluble copper salt may take the form of a sulphate, chloride, acetate or nitrate. Of these compounds copper sulphate may be preferred because it is readily available and relatively inexpensive.

When the mixture of copper sulphate and the alkanolamine are placed in water a copper complex ion is formed which keeps the copper in solution and prevents precipitation of the same as a hydroxide or carbonate. It is believed that the hydroxy groups help to bring about the formation of the soluble copper complex.

The amine group in the present algaecide is understood to improve the algaestatic action of the mixture and bring about more rapid penetration of the algae cells. The rapid penetrating power of the present algaecide makes it possible to use the same in fast moving bodies of water such as rivers, creeks or streams where heretofore an algaecide would be dispersed before penetration and destruction of the algae could be accomplished.

It has been found that a mixture of from about 1 to 2 parts of weight of triethanolamine with about 1 part by weight of copper sulphate results in an algaecidal compound which will maintain the copper in solution in a variety of hard waters containing various amounts of carbonates and bicarbonates of the alkaline earth metals, such as sodium, calcium, magnesium, and similar carbonates, or in waters which contain large amounts of dissolved carbon dioxide.

In a "hard" alkaline water that ordinarily would require from 1 to 20 p. p. m. (parts per million) of copper sulphate to destroy or inhibit the growth of algae, it was found that only ¼ to 5 p. p. m. of a mixture of triethanolamine and copper sulphate were needed to destroy the algae. In addition, no cloudy precipitate resulted regardless of the pH or alkalinity of the water.

Because the copper ions of the present algaecide remain in solution, the entire toxic effect of the copper is realized and this brings about a definite saving in copper and in total algaecide used, with a resulting saving in total cost.

As an example, the mixture of the triethanolamine and copper sulphate was employed in a fast moving trout stream containing high concentrations of carbonates and bicarbonates. It took merely 1 p. p. m. of the mixture to destroy excessive algae growths, known as Cladophera and Tribonema, while a similar test with copper sulphate required 6 p. p. m. to produce an equal destruction. Furthermore the use of the algaecide of the present invention resulted in a negligible deposit or accumulation of copper on the bottom of the stream. This fact is particularly important in bodies of water where it is desirable to preserve the fish life, for an accumulation of copper may tend to destroy the fish life or zooplankton or keep the same from thriving.

The alkanolamine and the water soluble copper salt may be mixed before introduction into the water and processed as by drying into a solid preparation, a paste, or a concentrated aqueous solution. As an alternative the two components may be introduced separately into the water. However, in the latter process it is desirable to initially add the alkanolamine to the water followed by the subsequent or simultaneous addition of the copper salt. Since the alkanolamine is the solubilizing agent and tends to keep the copper ions in solution it is essential that the alkanolamine be added with or before the copper salt to produce the most effective and economical treatment.

The present algaecide comprising an alkanolamine and a water soluble inorganic copper salt may be employed with equal effectiveness to kill and restrict the growth of obnoxious algae in either large bodies of rapidly moving water or in closed circulating water systems. By keeping the toxic copper ions in solution no cloudy precipitate is formed and no copper deposits are present which might kill fish or zooplankton. The algaecide also tends to destroy a great variety of undesirable biological forms such as fungi and slime-forming bacteria and in addition inhibits the growth of rooted water weeds.

Various embodiments of the invention may be employed within the scope of the following claims.

I claim:

1. A method of killing algae in waters containing the same, comprising bringing into contact with the algae an aqueous solution of a complex constituting the reaction product of a copper salt of an acid from the group consisting of acetic, nitric, sulphuric and hydrochloric acids and a lower molecular weight alkanolamine.

2. The method of claim 1 wherein the complex is formed in the algae containing water adjacent the algae by first adding thereto the alkanolamine and then the copper salt.

3. A method of killing algae in waters containing the same, comprising bringing into contact with the algae an aqueous solution of a complex constituting the reaction product of a water soluble copper salt of a mineral acid and a lower molecular weight alkanolamine.

4. A method of killing algae in waters containing the same, comprising bringing into contact with the algae an aqueous solution of a complex constituting the reaction product of a water soluble copper salt of a mineral acid and a lower molecular weight alkanolamine, said solution having a concentration approximating from one quarter to five parts of the complex to each million parts of water.

5. A method of killing algae in waters containing the same, comprising dispersing a concentrated solution of an algaecide composition comprising the dry complex constituting the reaction product in water solution of a water-soluble copper salt of a mineral acid and a low molecular weight alkanolamine in algae containing waters to bring the alkanolamine-copper salt complex into contact with the algae to be killed.

6. A method as claimed in claim 5 wherein said alkanolamine is selected from the group consisting of monoethanolamine, diethanolamine, triethanolamine, dimethylethanolamine, diethylethanolamine, aminoethylethanolamine, monoisopropanolamine, diisopropanolamine, triisopropanolamine and methyldiethanolamine.

7. The method of killing algae in waters containing the same, comprising adding to water at least one alkanolamine selected from the group consisting of monoethanolamine, diethanolamine, triethanolamine, dimethylethanolamine, diethylethanolamine, aminoethylethanolamine, monoisopropanolamine, diisopropanolamine, triisopropanolamine and methyldiethanolamine and then adding to the water to form a complex therewith a copper salt from the group consisting of copper sulphate, copper chloride, copper acetate and copper nitrate and bringing the resulting complex into contact with algae in said waters.

8. A method of killing algae in waters containing the same, comprising bringing into contact with the algae an aqueous solution of a complex of the type constituting the reaction product of copper sulphate and triethanolamine.

References Cited in the file of this patent

UNITED STATES PATENTS

| | | |
|---|---|---|
| 2,019,121 | De Rewal | Oct. 29, 1935 |
| 2,364,391 | Schiller | Dec. 5, 1944 |
| 2,400,863 | Gelfand | May 21, 1946 |
| 2,446,682 | Whitner | Aug. 10, 1948 |

FOREIGN PATENTS

| | | |
|---|---|---|
| 371,119 | Italy | May 12, 1939 |

OTHER REFERENCES

Mellor: Modern Inorganic Chemistry, Longman's Green and Co. (1939), page 590.